US012668043B2

(12) United States Patent
Walther et al.

(10) Patent No.: US 12,668,043 B2
(45) Date of Patent: Jun. 30, 2026

(54) FLEXIBLE POUCH WITH POST-CONSUMER RESIN

(71) Applicant: Dow Global Technologies LLC, Midland, MI (US)

(72) Inventors: Brian W. Walther, Freeport, TX (US); Jessica L Rogers, Freeport, TX (US); Ronald Wevers, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 404 days.

(21) Appl. No.: 17/768,908

(22) PCT Filed: Oct. 6, 2020

(86) PCT No.: PCT/US2020/054350
§ 371 (c)(1),
(2) Date: Apr. 14, 2022

(87) PCT Pub. No.: WO2021/076351
PCT Pub. Date: Apr. 22, 2021

(65) Prior Publication Data
US 2024/0100812 A1      Mar. 28, 2024

Related U.S. Application Data

(60) Provisional application No. 62/915,229, filed on Oct. 15, 2019.

(51) Int. Cl.
| | |
|---|---|
| *B32B 27/08* | (2006.01) |
| *B32B 27/32* | (2006.01) |
| *B65D 75/26* | (2006.01) |

(52) U.S. Cl.
CPC .............. *B32B 27/08* (2013.01); *B32B 27/32* (2013.01); *B65D 75/26* (2013.01);
(Continued)

(58) Field of Classification Search
CPC ..... B32B 27/08; B32B 27/32; B32B 2250/05; B32B 2250/40; B32B 2272/00;
(Continued)

(56) References Cited

U.S. PATENT DOCUMENTS

| | | |
|---|---|---|
| 3,122,297 A | 2/1964 | Sachs |
| 3,204,825 A | 9/1965 | Underwood |
| (Continued) | | |

FOREIGN PATENT DOCUMENTS

| | | |
|---|---|---|
| DE | 102017123135 A1 | 4/2019 |
| EP | 0707956 A1 | 4/1996 |
| (Continued) | | |

*Primary Examiner* — Peter N Helvey
(74) *Attorney, Agent, or Firm* — Boyle Fredrickson S.C.

(57) ABSTRACT

The present disclosure provides a flexible pouch. In an embodiment, the flexible pouch includes a first layer structure and a second layer structure. Each layer structure includes (i) an inner liner and (ii) an outer sheath. The first layer structure is superimposed on the second layer structure such that the inner liners oppose each other. The first layer structure superimposed upon the second layer structure defines a common peripheral edge. Each inner liner is composed of a flexible film of a polymeric material. Each outer sheath is composed of a post-consumer recycle (PCR) polymer material. The PCR polymer material has a GI200 value greater than 50. The flexible pouch includes a peripheral seal. The peripheral seal extends along at least a portion of the common peripheral edge. The peripheral seal seals the first layer structure to the second layer structure.

20 Claims, 1 Drawing Sheet

(52) U.S. Cl.
CPC ..... *B32B 2250/05* (2013.01); *B32B 2250/242* (2013.01); *B32B 2250/40* (2013.01); *B32B 2272/00* (2013.01); *B32B 2307/31* (2013.01); *B32B 2307/581* (2013.01); *B32B 2439/46* (2013.01); *B32B 2439/70* (2013.01)

(58) Field of Classification Search
CPC .......... B32B 2307/31; B32B 2307/581; B32B 2439/46; B32B 2439/70
USPC ......................................................... 383/107
See application file for complete search history.

(56)                    References Cited

U.S. PATENT DOCUMENTS

| | | | | |
|---|---|---|---|---|
| 4,743,499 | A * | 5/1988 | Volke .................... | B32B 27/065 602/56 |
| 4,868,025 | A * | 9/1989 | Strzelewicz ...... | B29C 66/81427 229/5.6 |
| 4,982,872 | A | 1/1991 | Avery | |
| 5,677,383 | A | 10/1997 | Chum et al. | |
| 6,111,023 | A | 8/2000 | Chum et al. | |
| 6,984,695 | B2 | 1/2006 | Brown et al. | |
| 7,029,734 | B1 * | 4/2006 | Wuest .................... | B32B 27/08 428/35.8 |
| 10,851,960 | B2 | 12/2020 | Kogure | |
| 11,667,415 | B2 * | 6/2023 | Michels .................... | B65B 9/22 53/551 |
| 11,745,461 | B2 * | 9/2023 | Wilcoxen ............. | B29C 66/305 428/167 |

| | | | | |
|---|---|---|---|---|
| 2004/0043238 | A1 * | 3/2004 | Wuest .................... | B32B 15/08 428/500 |
| 2006/0251343 | A1 * | 11/2006 | True ................... | B65D 88/1606 383/118 |
| 2007/0025648 | A1 * | 2/2007 | Micnerski .......... | B65D 75/5877 383/105 |
| 2007/0217718 | A1 * | 9/2007 | Micnerski .......... | B65D 75/5877 383/105 |
| 2011/0086188 | A1 * | 4/2011 | Williams, Jr. .......... | B41M 5/30 428/32.39 |
| 2011/0293206 | A1 | 12/2011 | Tamber | |
| 2012/0199675 | A1 | 8/2012 | Kulesa et al. | |
| 2015/0307264 | A1 * | 10/2015 | Boswell .................... | B32B 7/12 383/116 |
| 2016/0257440 | A1 | 9/2016 | McIntyre et al. | |
| 2019/0092564 | A1 * | 3/2019 | Wood .................. | B31B 70/8135 |
| 2019/0366673 | A1 * | 12/2019 | Yasuumi ................... | B32B 3/30 |
| 2020/0087493 | A1 * | 3/2020 | Chow .................... | C08L 23/04 |
| 2020/0256537 | A1 | 8/2020 | Kogure | |
| 2023/0211576 | A1 * | 7/2023 | Ferracane .......... | B65D 33/2508 |
| 2023/0415449 | A1 * | 12/2023 | Tattam .................... | B32B 1/00 |
| 2024/0003142 | A1 * | 1/2024 | Boucké .................... | B32B 7/14 |

FOREIGN PATENT DOCUMENTS

| | | | |
|---|---|---|---|
| JP | H06-69146 | U | 9/1994 |
| JP | 2006-022162 | A | 1/2006 |
| JP | 2019-025695 | A | 2/2022 |
| WO | 2016/040765 | A1 | 3/2016 |
| WO | WO 2016/109544 | * | 7/2016 |

* cited by examiner

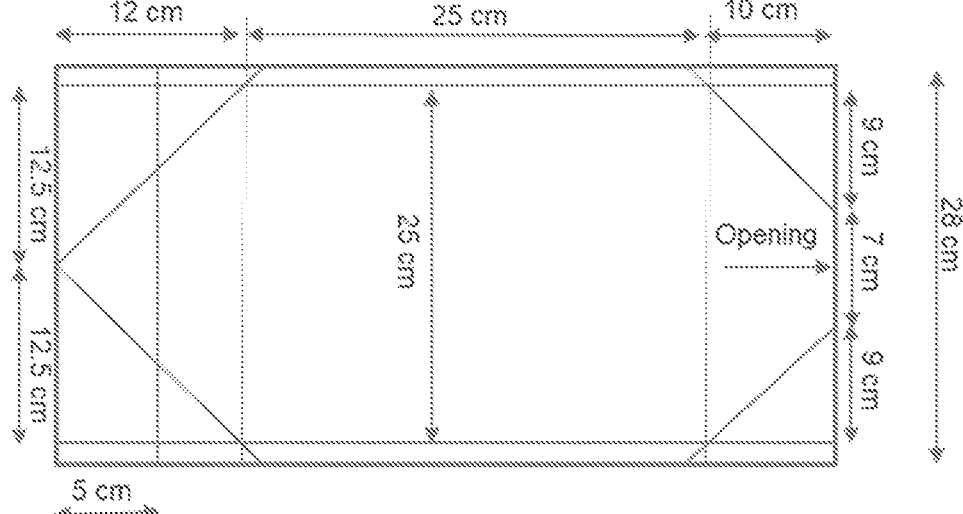

FLEXIBLE POUCH WITH POST-CONSUMER RESIN

BACKGROUND

Social, political and economic pressures are driving the industry to utilize post consumer resin polymeric material (PCR). Well known are the environmental hazards caused by plastic waste. Large-scale societal efforts are employed to recycle and re-use plastic materials, commonly known as post consumer resin (PCR). Endeavors to re-process and re-incorporate PCR back into usable consumer articles continue to expand.

In flexible film applications, the inherent variability of PCR makes the use of PCR in high performance liquid flexible packaging challenging. The intrinsic waste aspect of PCR means that PCR suffers from the nuisance of foul odor and when in food contact, which can contribute unpleasant tastes. These drawbacks of PCR make it difficult to use for food-contact applications.

For liquid packaging, the package structure provides two fundamental roles. A flexible pouch for holding a liquid, for example, must hold the liquid contents without leakage and at a failure rate of less the one leak per 100,000 flexible packages. Another challenge facing flexible packaging is that the flexible pouch must have sufficient structural integrity to survive the supply chain in addition to holding the liquid content. In other words, the flexible pouch must have adequate structure, integrity, and strength to survive the rigors and stresses of processing, filling, warehousing, distribution, merchandising, and consumer use.

The art recognizes the need for a flexible pouch containing PCR and having the ability to function as a flexible pouch, namely, a pouch that is leak-free and strong enough to survive and function through the supply chain.

SUMMARY

Applicant discovered a packaging geometry to support liquid contents without leakage that also utilizes PCR.

The present disclosure provides a flexible pouch. In an embodiment, the flexible pouch includes a first layer structure and a second layer structure. Each layer structure includes (i) an inner liner and (ii) an outer sheath. The first layer structure is superimposed on the second layer structure such that the inner liners oppose each other. The first layer structure superimposed upon the second layer structure defines a common peripheral edge. Each inner liner is composed of a flexible film of a polymeric material. Each outer sheath is composed of a post-consumer recycle (PCR) polymer material. The PCR polymer material has a GI200 value greater than 50. The flexible pouch includes a peripheral seal. The peripheral seal extends along at least a portion of the common peripheral edge. The peripheral seal seals the first layer structure to the second layer structure.

BRIEF DESCRIPTION OF THE DRAWINGS

FIG. 1 is a top plan view of a flexible pouch in a collapsed configuration, in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra-low density polyethylene (ULDPE), very low density polyethylene (VLDPE), multicomponent ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.860 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, or 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPULIN™ (available from LyondellBasell), as well as HDPE products from *Borealis*, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin, comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin, or $C_4$-$C_8$ α-olefin, that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from *Borealis*, Ineos, ExxonMobil, and others.

"Multi-component ethylene-based copolymer" (or "EPE") comprises units derived from ethylene and units derived from at least one $C_3$-$C_{10}$ α-olefin, or $C_4$-$C_8$ α-olefin, comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and, optionally, may contain at least one comonomer. Nonlimiting examples of an olefin-based polymer include ethylene-based polymer or propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Density is measured in accordance with ASTM D792, Method B. The result is recorded in grams per cubic centimeter (g/cc).

Differential Scanning Calorimetry (DSC). Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules pergram), and the calculated % crystallinity for polyethylene samples using the following Equation: % Crystallinity=$((H_f)/292 \text{ J/g}) \times 100$. Glass transition temperature, Tg, is determined from the DSC heating curve where half the sample has gained the liquid heat capacity as described in Bernhard Wunderlich, *The Basis of ThermalAnalysis*, in *Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

GI200 is defined as the sum of the areas of all gels with diameter greater than 200 microns. An OCS FSA-100 line gel counter consisting of a lighting unit, a CCD detector and an image processor with the Gel counter software version 5.0.4.6, available form OCS Optical Control Systems GmbH, or equivalent is used to determine GI200. 25 parcels are analyzed, where a parcel is defined as 24.6 cm³ of film, or 0.324 m² for a film thickness of 76 µm (microns).

Gel Count: The gel count is the number of gels detected by the gel camera; the counted gels are further classified based on the equivalent circular diameter of the area measured into the following categories: less than 100 microns, between 100 and 150 microns, between 150 and 200 microns, between 200 and 400 microns, between 400 and 800 microns, between 800 and 1600 microns, and greater than 1600 microns. GI200 is defined as the sum of the areas of all gels with a diameter greater than 200 microns, averaged over 25 parcels (GI200 units mm² of gels per 24.6 cm³ of film). The diameter of a gel is determined as the diameter of a circle having an equivalent area. One analysis cycle inspects 24.6 cm³ of film. The corresponding area is 0.324 m² for a film thickness of 76 microns and 0.647 m² for a film thickness of 38 microns. Alternatively, a gel ppm is measured using the above described technique and GI200 is approximately the gel ppm divided by 3.

Melt flow rate (MFR) in g/10 min is measured in accordance with ASTM D1238 (230° C./2.16 kg).

Melt index (MI) (12) in g/10 min is measured in accordance with ASTM D1238 (190° C./2.16 kg).

Yellowness Index (YI) for granular and pelletized polyethylene is achieved using the Hunter ColorFlex EZ™ Spectrometer following the ASTM procedures, D6290, Standard Test Method for Color Determination of Plastic Pellets, and E313, Standard Practice for Calculating Yellowness and Whiteness Indices from Instrumentally Measured Color Coordinates.

DETAILED DESCRIPTION

The present disclosure provides a flexible pouch. In an embodiment, the flexible pouch includes a first layer structure and a second layer structure. Each layer structure includes (i) an inner liner and (ii) an outer sheath. The first layer structure is superimposed on the second layer structure such that the inner liners oppose each other. The first layer structure superimposed upon the second layer structure defines a common peripheral edge. Each inner liner is composed of a flexible film of a polymeric material. Each outer sheath is composed of a post-consumer recycle (PCR) polymer material. The PCR polymer material has a GI200 value greater than 50. The flexible pouch includes a peripheral seal. The peripheral seal extends along at least a portion of the common peripheral edge. The peripheral seal seals the first layer structure to the second layer structure.

The present flexible pouch includes a first layer structure and a second layer structure. The term "layer structure," as used herein, is a structure composed of at least two discrete structures, namely (i) an inner liner, and (ii) an outer sheath. The inner liner and the outer sheath each is a discrete sheet-like article that is flexible, flat and composed of an extruded thermoplastic material or a cast thermoplastic material, the inner liner and the outer sheath each having a consistent and uniform thickness from 0.25 millimeters (mm) to 6.35 mm (250 mils).

The components of each layer structure (i.e., the inner liner and the outer sheath) can be composed of a single polymer material or a blend of two or more polymer materials; the components of each layer structure having either a monolayer configuration or a multilayer configuration (coextruded multilayer and/or laminated multilayer).

The first layer structure is superimposed on the second layer structure such that the inner liners oppose each other. The first layer structure superimposed upon the second layer structure defines a common peripheral edge. The common peripheral edge defines a perimeter shape for the flexible pouch. The perimeter shape for the flexible pouch can be a polygon (such as triangle, square, rectangle, diamond, pentagon, hexagon, heptagon, octagon, etc.) or an ellipse (such as an ovoid, an oval, or a circle).

The first layer structure and the second layer structure each includes an inner liner. The first layer structure includes a first inner liner. The second layer structure includes a second inner liner. Each inner liner is composed of a flexible film composed of a polymeric material. Each inner liner is resilient, flexible, deformable, and pliable.

In an embodiment, each inner liner is a flexible multilayer film having at least three layers. The flexible multilayer film has an A/B/A layer structure. Layer A is a sealant layer composed of a LLDPE. Layer B is an abuse layer composed of an ethylene-based polymer. The A/B/A flexible multilayer film has a layer volume of 20/60/20 and the flexible multilayer film has a thickness from 10 microns, or 20 microns to 40 microns, or 80 microns.

In an embodiment, the flexible multilayer film for each inner liner has an A/B/C/B/A layer structure. Layer A is a sealant layer composed of a LLDPE. Layer B is tie layer composed of a maleic anhydride grafted ethylene-based polymer or polymer blend. Layer C is a barrier layer such as polyamide or ethylene-vinyl alcohol (EVOH). The A/B/C/B/A flexible multilayer film has a layer volume of 15/5/60/5/15 and the flexible multilayer film has a thickness from 10 microns, or 20 microns to 40 microns, or 80 microns. The barrier layer may serve to prevent oxygen and/or aroma transmission.

The first layer structure and the second layer structure each includes an outer sheath. The first layer structure includes a first outer sheath. The second layer structure includes a second outer sheath. Each outer sheath is composed of a post-consumer recycle (PCR) polymer material. The PCR used to make the outer sheath has a GI200 value greater than 50.

The term "post consumer resin" (or "PCR") is a polymeric material that has been previously used as consumer packaging or industrial packaging. In other words, PCR is waste plastic. PCR is typically collected from recycling programs and recycling plants. PCR typically requires additional cleaning and processing before it can be re-introduced into a manufacturing line. The PCR may include one or more of an ethylene-based polymer, a propylene-based polymer, a polyester, a poly(vinyl chloride), a polystyrene, an acrylonitrile butadiene styrene, a polyamide, an ethylene vinyl alcohol, an ethylene vinyl acetate, or a poly-vinyl chloride. The PCR may include one or more contaminants. The contaminants may be the result of the polymeric material's use prior to being repurposed for reuse. In some embodiments, contaminants may include paper, ink, food residue, or other recycled materials in addition to the polymer, which may result from the recycling process. It is understood PCR includes post industrial recycle (PIR) resin.

PCR is distinct from virgin polymeric material. Since PCR has gone through an initial heat and molding process; PCR is not "virgin" polymeric material. A "virgin polymeric material" is a polymeric material that has not undergone, or otherwise has not been subject to, a heat process or a molding process. The physical, chemical and flow properties PCR resin differ when compared to virgin polymeric resin.

In an embodiment, the PCR is polyethylene-PCR. Nonlimiting examples of sources for polyethylene-PCR include HDPE packaging such as bottles (milk jugs, juice containers), and LDPE/LLDPE packaging such as films. Polyethylene-PCR also includes residue from its original use, residue such as paper, adhesive, ink, nylon, ethylene vinyl alcohol (EVOH), polyamide (PA), polyethylene terephthalate (PET), and other odor causing agents.

Nonlimiting examples of suitable polyethylene-PCR include PCR sold by Envision Plastics, North Carolina, USA, under the tradenames EcoPrime™, PRISMA™, Natural HDPE PCR Resins, Mixed Color and Black HDPE PCR Resins; PCR sold by KW Plastics, Alabama, USA under the following tradenames KWR101-150, KWR101-150-M5-BLK, KWR101-150-M10 BLK, KWR102-8812 BLK, KWR102, KWR102LVW, KWR105, KW620, KWR102-

8

M4, KWR-105M2, KWR105M4, KWR621 FDA, KWR621-20-FDA, KW308A, KW621, KW621-T10, KW621-T20, KW622-20, KW622-35, KW627C, KW1250G, and KWBK10-NB.

In an embodiment, the outer sheath is composed of 100 wt % PCR, wherein weight percent is based on the total weight of the outer sheath.

In an embodiment, in addition to the PCR, the outer sheath may optionally include an olefin-based polymer. The olefin-based polymer can be a propylene-based polymer or an ethylene-based polymer. Nonlimiting examples of propylene-based polymer include propylene copolymer, propylene homopolymer, and combinations thereof. In an embodiment, the propylene-based polymer is a propylene/α-olefin copolymer. Nonlimiting examples of suitable α-olefins include $C_2$ and $C_4$-$C_{20}$ α-olefins, or $C_4$-$C_{10}$ α-olefins, or $C_4$-$C_8$ α-olefins. Representative α-olefins include ethylene, 1-butene, 1-pentene, 1-hexene, 1-heptene and 1-octene. In an embodiment, the olefin-based polymer is a virgin olefin-based polymer.

In an embodiment, the propylene/α-olefin copolymer is a propylene/ethylene copolymer containing greater than 50 wt % units derived from propylene, or from 51 wt %, or 55 wt %, or 60 wt % to 70 wt %, or 80 wt %, or 90 wt %, or 95 wt %, or 99 wt % units derived from propylene, based on the weight of the propylene/ethylene copolymer. The propylene/ethylene copolymer contains a reciprocal amount of units derived from ethylene, or from less than 50 wt %, or 49 wt %, or 45 wt %, or 40 wt % to 30 wt %, or 20 wt %, or 10 wt %, or 5 wt %, or 1 wt %, or 0 wt % units derived from ethylene, based on the weight of the propylene/ethylene copolymer.

In an embodiment, the olefin-based polymer is an ethylene-based polymer. The ethylene-based polymer can be an ethylene homopolymer or an ethylene/α-olefin copolymer.

In an embodiment, the ethylene-based polymer is an ethylene/α-olefin copolymer. Nonlimiting examples of suitable α-olefins include $C_3$-$C_{20}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene.

In an embodiment, the outer sheath contains from 5 wt %, or 20 wt %, or 30 wt %, or 40 wt %, or 50 wt % to 60 wt %, or 70 wt %, or 80 wt %, or 95 wt % PCR and a reciprocal amount of virgin olefin-based polymer or from 95 wt %, or 80 wt %, or 70 wt %, or 60 wt %, or 50 wt % to 40 wt %, or 30 wt %, or 20 wt %, or 5 wt % virgin olefin-based polymer. Weight percent is based on total weight of the outer sheath.

The outer sheath composed of the PCR has a GI200 value greater than 50. In an embodiment, the PCR in the outer sheath has a GI200 value from 100 or 200 or 500 to 1000, or 5000, or 10,000. In a further embodiment, the PCR has a GI200 value from 100 to 10,000, or from 200 to 5000, or from 300 to 1600, or from 300 to 1000.

In an embodiment, the outer sheath is surface printed and/or coated with a high temperature lacquer to protect the ink or provide heat protection on the surface during the heat sealing process.

In an embodiment, each layer structure includes from 10 volume percent (vol %) to 90 vol % of the outer sheath and a reciprocal volume percentage for the inner liner, or from 90 vol % to 10 vol % for the inner liner. Volume percent is based the total volume of the layer structure.

In an embodiment, each layer structure includes from greater than 50 vol % to 95 vol % of the outer sheath and a reciprocal volume percent for the inner liner, or from less than 50 vol % to 5 vol % inner liner.

The present flexible pouch includes a peripheral seal. The peripheral seal extends along at least a portion of the common peripheral edge. In an embodiment, the peripheral seal extends along the entire common peripheral edge. The peripheral seal forms a storage compartment within the flexible pouch.

In an embodiment, the flexible pouch includes a fitment located between the first layer structure and the second layer structure along the peripheral seal. The peripheral seal hermetically seals the fitment between the first layer structure and the second layer structure.

The peripheral seal seals, or otherwise adheres, the first layer structure to the second layer structure. The peripheral seal is formed by way of ultrasonic seal, heat seal, adhesive seal, and combinations thereof. The peripheral seal includes opposing seal layers of each inner liner, in direct contact with each other.

In an embodiment, the peripheral seal is formed by way of a heat sealing procedure. The term "heat sealing," as used herein, is the act of placing the two layer structures between opposing heat seal bars, the heat seal bars move toward each other, sandwiching the layer structures and applying heat and pressure to the layer structures such that opposing interior surfaces (seal layers) of the layer structures contact, melt, and form a heat seal, or a weld, to attach the layer structures to each other. Heat sealing includes suitable structure and mechanism to move the seal bars toward and away from each other in order to perform the heat sealing procedure. Consequently, the term, "heat seal," as used herein, is a weld formed between two layer structures subjected to the heat sealing process, the weld composed of melted polymeric material from the first heat sealed layer structure and also melted polymeric material from the second heat sealed layer structure, the melted polymeric materials subsequently solidified.

In an embodiment, the peripheral seal includes a heat seal between the opposing inner liners. In a further embodiment, each inner liner is the flexible multilayer film with A/B/A structure. The heat seal is a weld formed of the A layer material of the first inner liner and the A layer material of the second inner liner.

In an embodiment, the peripheral seal includes a heat seal between the outer sheath and its respective inner liner. The heat seal includes a weld between the first inner liner and the first outer sheath. The heat seal also includes a weld between the second inner liner and the second outer sheath.

In an embodiment, when the peripheral seal is viewed from a cross-sectional view, the peripheral seal has the following layer structure: first outer sheath/first inner liner/second inner liner/second outer sheath wherein "/" denotes layer interface. It is understood that a weld is present at each layer interface, "/."

In an embodiment, the peripheral seal includes the first outer sheath that is heat sealed to the first inner liner; the first inner liner that is heat sealed to the second inner liner; and the second inner liner that is heat sealed to the second outer sheath.

In an embodiment, the peripheral seal is the sole seal, or otherwise is the only seal, between the inner liner and its respective outer sheath. Other than at the peripheral seal, the outer sheath/inner liner interface is void of adhesive contact. Other than at the peripheral seal, the inner surface of the outer sheath contacts, or directly contacts, the outer surface of its respective inner liner, the direct contact lacking, or otherwise void of, adhesive contact. The term "adhesive contact," as used herein is contact immobilizing movement between the films with respect to each other. The term "directly contacts," or "in direct contact with," or similar terms as used herein, refers to a film layer configuration whereby a first film layer is located immediately adjacent to a second film layer, the first film layer touches the second film layer, and no intervening layers, and/or no intervening structures, are present between the first film layer and the second film layer. In this way a gap, or a void, exists between the inner liner and its respective outer sheath except at the peripheral seal.

The peripheral seal seals the first layer structure to the second layer structure and the gap between each outer sheath and its respective inner liner is present at areas of the flexible pouch where the peripheral seal does not extend. Stated differently, except at the peripheral seal, the gap is present at the outer sheath-inner liner interface. The gap, or void, present at the outer sheath-inner liner interface is a void of air and permits movement, and/or separation, between the outer sheath and the inner liner at areas of the flexible pouch, other than at the peripheral seal.

The present flexible pouch has adhesion (vis-à-vis the welds) between the layer structures, at the outer sheath/inner liner interface, and at the liner/liner interface only at the peripheral seal. For the present flexible pouch, any layer interface not located at the peripheral seal does not entail adhesion. A gap, or a void, is present at the outer sheath/inner liner interface. A gap, or a void, is present between the inner liner/inner liner interface, other than at the peripheral seal. Applicant discovered that the gap advantageously provides (i) a barrier between the outer sheath and its respective inner liner, and (ii) also contributes to the drop strength of the flexible pouch.

In an embodiment, each layer structure includes a print film. The print film directly contacts the outer surface of the PCR sheath. The print film covers the PCR sheath. Consequently, the print film is the outermost layer for each layer structure and for the flexible pouch. With provision of the print film, the PCR sheath is not visible when an on-looker views, or otherwise observes, the flexible pouch. Nonlimiting examples of suitable material for the print film include polyethylene terephthalate (PET), biaxially oriented polypropylene (BOPP), and ethylene-based polymer, such as HDPE.

With provision of the print film, the peripheral seal of the flexible pouch includes a heat seal between the print film and its respective PCR sheath in addition to the heal seal between the PCR sheath and its respective inner liner. The heat seal includes a weld between the first inner liner and the first PCR sheath and a weld between the PCR sheath and the first print film. The heat seal also includes a weld between the second inner liner and the second PCR sheath and a weld between the second PCR sheath and the second print film.

With provision of the print film, the peripheral seal when viewed from a cross-sectional view, has the following layer configuration: first print film/first PCR sheath/first inner liner/second inner liner/second PCR sheath/second print film, wherein "/" denotes layer interface. It is understood that a weld is present at each layer interface, "/."

In an embodiment, the flexible pouch includes a comestible in the storage compartment. The comestible is in direct contact with one, or both, of the inner liners. The comestible does not contact the outer sheath. The air gap at the outer sheath-inner liner interface provides additional barrier between the PCR in the outer sheath and the comestible in the storage compartment. The comestible may be a solid substance and/or a liquid substance. Nonlimiting examples of suitable liquid comestibles include industrial cleaning chemical, industrial additives, solvents, liquid soap or food contents such as beverages, sauces, condiments (ketchup, mustard, mayonnaise), butter, and baby food. Nonlimiting examples of suitable solid comestibles include industrial granules, powdered soap, salt crystals or food related products such as powdered sugars, grains, meat chunks, granular solids, animal feed, and pet food.

The present disclosure provides another flexible pouch. In an embodiment, the flexible pouch includes a first layer structure and a second layer structure. Each layer structure By way of example, and not limitation, some embodiments of the present disclosure will now be described in detail in the following Examples.

EXAMPLES

Materials used in the examples are provided in Table 1 below.

TABLE 1

| | | Materials | | |
|---|---|---|---|---|
| Component | Structure Material Abbreviation | Material Properties (units: d- g/cc, MI - g/10 min: Tm ° C.; YI; GI200 - | | Source |
| Inner liner | A/B/A 20/60/20 Thickness, 25 microns (1 mil) | A layer (sealant) AFFINITY 1146G (ethylene/octene copolymer) d = 0.899, Tm = 95, MI = 1.0 B layer (abuse) is INNATE ST50 LLDPE (ethylene/octene copolymer) d = 0.918, Tm = 124. MI = 0.85 | | The Dow Chemical Company |
| Outer sheath PCR 1 | Monolayer 150 microns (6 mils) | Envision Ecoprime Post consumer resin (PCR) HDPE d = 0.958-0.965; MI = 0.55-0.85; YI 11.5; GI200 307 | | Envision Ecoprime |
| Outer sheath PCR 2 | Monolayer 150 microns (6 mils) | Avangard 100 LLDPE/LDPE d = 0.935; MI = 0.73; YI 19; GI200: 500 | | Avangard Innovative |
| Outer sheath PCR 3 | Monolayer 150 microns (6 mils) | EFS HDPE LLDPE/LDPE d = 0.952; MI = 0.58; YI = 19; GI200 1571 | | EFS-plastics |
| Outer sheath PCR 4 | Monolayer 150 microns (6 mils) | EFS Grey LLDPE/LDPE d = 0.94; MI = 0.8; YI = -9; GI200 1234 | | EFS-plastics |
| Outer sheath PCR 5 | Monolayer 150 microns (6 mils) | EFS Translucent LLDPE/LDPE d = 0.932; MI = 1.0; YI = 11; GI200 852 | | EFS-plastics | includes a PCR layer, a foam layer, and a seal layer. The foam layer is located between the PCR layer and the seal layer. The PCR layer is the outermost layer. The seal layer is the innermost layer. The first layer structure and the second layer structure are superimposed on each other such that the seal layers oppose each other. The superimposed first layer structure and second layer structure define a common peripheral edge. The PCR has a GI200 value greater than 50. The flexible pouch includes a peripheral seal. The peripheral seal extends along at least a portion of the common peripheral edge. The peripheral seal seals the first layer structure to the second layer structure.

The foam layer may be a discrete layer. Alternately, the foam layer may be integral to the PCR layer.

In an embodiment, the foam layer is composed of a PCR that is foamed. The PCR of the foam layer may be the same as, or different than, the PCR of the outermost layer.

In an embodiment, each layer structure is a coextruded structure wherein the PCR, the foam, and the inner layer are coextruded together. When the layer structure is a coextruded structure with a foam layer, each layer structure has the following layer configuration: outer PCR/foam/inner liner, wherein "/" denotes layer interface.

In an embodiment, the foam layer is generated in situ by utilizing, or otherwise introducing, a foaming agent into a polymeric material that is coextruded between the outer PCR layer and the inner liner layer during the co-extrusion process. Each layer structure has the following layer configuration: outer PCR/foam (in situ)/inner liner, wherein "/" denotes layer interface.

A. Inner Liner/Outer Sheath Preparation

1. Inner Liner a. inner liner structure—three layer multilayer film where the outer layers are both sealant layers with the core layer is a high puncture resistant polymer. The three layer film, with layer structure A/B/A, was prepared using a conventional blown film line with a layer ratio of 20/60/20 wherein each A layer is a sealant layer composed of AFFINITY 1146G and the B layer is composed of LLDPE INNATE ST50. The total film thickness for the inner liner is 25 microns (1 mil).

b. Process for inner liner production—an Alpine seven layer extrusion line was used where layers 1 and 2 each were 10% layers with AFFINITY 1146G, layers 3, 4, and 5 were 20% layers with INNATE ST50, and layers 6 and 7 each were 10% layers with AFFINITY 1146G.

2. Outer Sheath a. PCR outer sheath—monolayer film was produced using a conventional blown film process where the polymer was used without any compounding to produce the target film. In most cases the PCR pellets were dried using a drier.

b. PCR pellet drying—Approximately 50 pounds of each of the PCR resins were placed in a forced air oven drier, a Conair Franklin "Closed Loop" Dehumidifying Dryer, for greater than 12 hours to remove any moisture. The dry air temperature was set for 60° C. (140° F.). The dried PCR pellets were stored in moisture proof bags until use.

c. Process for outer sheath production—a LabTech five layer blown film extrusion line was used where all the extruder feeds were filled with the unmodified PCR pellets. The blow up ratio was 2.5 with a final film thickness of 150 microns (6 mils) for each monolayer outer sheath.

B. Pouch Production

The inner liner was cut to a rectangular shape of 28 cm (11 inches) by 51 cm (20 inches). The outer sheath was cut to a rectangular shape of 28 cm (11 inches) by 51 cm (20 inches). Two inner liners and two outer sheaths were stacked and aligned directly on top of each other such that the seal layers A of the inner liners oppose each other. The inner liners/outer sheaths are stacked and arranged to define a common peripheral edge according to the following order shown in Structure A below.

Structure A
    i. Layer 1 (bottom layer)—outer sheath
    ii. Layer 2—inner liner layer
    iii. Layer 3—inner liner layer
    iv. Layer 4 (top layer)—outer sheath The inner liners and outer sheaths of Structure A were sealed together to form a peripheral seal along the common peripheral edge using an Impulse Heat Sealer. The degree of sealing was adjusted on the dial until the inner liners/outer sheaths would seal together without any burn through at the sealing point. With formation of the peripheral seal, Structure A is formed into a flexible pouch with a storage compartment and an unsealed area along the common peripheral edge. The unsealed area along the common peripheral edge is an opening for introducing content into the storage compartment.

C. Filling Flexible Pouch

The flexible pouch was filled with water through the opening shown in FIG. 1. 5.5 kg of water was added to the flexible pouch such that the water was added between the two inner sealant layers. The water does not contact outer sheaths at any point in the flexible pouch design. After the filling is complete, the opening of the flexible pouch was sealed using a pressure sensitive adhesive. The flexible pouch does not have any adhesive contact between inner liners and outer sheaths other than at the peripheral seal and at the opening seal.

Before testing the flexible pouch was inspected for any leaks. Only pouches with no leaks were evaluated further.

D. Drop Test for Flexible Pouch

A Lansmont Bottle Drop Tester is used for drop testing. The Lansmont Bottle Drop Tester is equipped with a horizontal plate upon which the flexible pouch is positioned. The flexible pouch will remain in a horizontal position without any restraints to keep its position.

The drop surface is a smooth metal surface. After each test all water is removed from the metal surface. The actuator arm will drop out from under the flexible pouch faster than the acceleration speed so that the pouch will fall to metal surface. After each drop, the flexible pouch was inspected. The flexible pouch was considered a failure if there was a breach in the structure that resulted in a water leak.

E. Data Analysis

To determine the utility of the flexible pouch with Structure A, a bag with only inner liners sealed to each other was formed and was tested by itself. The bag has the Structure B below.

Structure B
    i. Layer 1—inner liner layer
    ii. Layer 2—inner liner layer

Comparative Blank ID 1 and Comparative Blank ID each is a sealed flexible bag having Structure B and filled with water. In Comparative Blank ID 1 and Comparative Blank ID 2, each bag passed the drop test from a 0.91 meter drop. However, when dropped from 1.22 meters, Comparative Blank ID 1 and Comparative Blank ID 2 each failed both times.

To determine the utility of the flexible pouch with Structure A, a bag with only outer sheaths sealed to each other was formed and was tested by itself. The bag with only outer sheaths has the Structure C below.

Structure C
    i. Layer 1—outer sheath layer
    ii. Layer 2—outer sheath layer In comparative samples (CS) 1, 2, 3, 4, the outer sheath was used to make a bag having the same dimensions as the flexible pouch. The drop test results for all the comparative samples are provided in Table 2 below.

TABLE 2

| | | | Drop height (ft) + Number of times to failure | | | | |
|---|---|---|---|---|---|---|---|
| Sample Bags | ID | Sample description | 3 ft 0.91 meters | 4 ft 1.22 meters | 5 ft 1.52 meters | 7 ft 2.13 meters | 9 ft 2.74 meters |
| Comparative Blank | 1 | 1 layer structure - Sealant film (1 mil, ABA) | 1 - pass | 1 - fail | | | |
| | 2 | 1 layer structure - Sealant film (1 mil, ABA) | 1 - pass | 1 - fail | | | |
| | 3 | 1 layer structure - Sealant film (1 mil, ABA) | --> | 1 - fail | | | |
| | 4 | 1 layer structure - Sealant film (1 mil, ABA) | --> | 1 - fail | | | |
| Comparative 1 Envision Ecoprime | 1 | 1 layer structure - PCR 1 | 1 - fail | | | | |
| | 2 | 1 layer structure - PCR 1 | 1 - fail | | | | |
| Comparative 2 Avangard 100 | | 1 layer structure - PCR 2 | 1 - pass | 1 - pass | 1 - pass | 1 - pass | |
| | | 1 layer structure - PCR 2 | 1 - pass | 1 - fail | | | |
| Comparative 3 EFS HDPE | 1 | 1 layer structure - PCR 3 | 1 - fail | | | | |
| | 2 | 1 layer structure - PCR 3 | 1 - fail | | | | |

TABLE 2-continued

| | | Drop test results for comparative bags | | | | |
|---|---|---|---|---|---|---|
| | | | Drop height (ft) + Number of times to failure | | | |
| Sample Bags | ID | Sample description | 3 ft 0.91 meters | 4 ft 1.22 meters | 5 ft 1.52 meters | 7 ft 2.13 meters | 9 ft 2.74 meters |
| Comparative 4 EFS Grey | 1 | 1 layer structure - PCR 4 | 2 - pass | 1 - pass | 1 - fail | | |
| | 2 | 1 layer structure - PCR 4 | 2 - pass | 1 - fail | | | |
| | 3 | 1 layer structure - PCR 4 | --> | 1 - fail | | | |
| | 4 | 1 layer structure - PCR 4 | --> | 1 - fail | | | |

Comparative blank samples 1-4 in Table 2 above demonstrated a 100% failure rate at 1.22 meter drop with comparative blank samples 3 and 4 showing 100% failure at 0.91 meter drop. Comparative samples (CS) 1-4 showed at least a 50% failure rate at 1.22 meters.

For the flexible pouches of inventive examples (IE) 1, 2, 3, 4, 5, the inner liner is the same and is the inner liner shown in Table 1. The PCR resin for the outer sheath is varied in each of IE1-5. Drop test results for inventive examples 1, 2, 3, 4, 5 are provided in Table 3 below.

TABLE 3

| | | Drop test results for inventive flexible pouches | | | | |
|---|---|---|---|---|---|---|
| | | | Drop height (ft) + Number of times to failure | | | |
| Sample Bags | ID | Sample description | 3 ft 0.91 meters | 4 ft 1.22 meters | 5 ft 1.52 meters | 7 ft 2.13 meters | 9 ft 2.74 meters |
| Comparative Blank | 1 | 1 layer structure - inner liner (1 mil, ABA) | 1 - pass | 1 - fail | | | |
| | 2 | 1 layer structure - inner liner (1 mil, ABA) | 1 - pass | 1 - fail | | | |
| Inventive 1 Envision Ecoprime | 1 | 2 layer structure - inner liner + PCR 1 | --> | 1 - pass | 1 - fail | | |
| | 2 | 2 layer structure - inner liner + PCR 1 | --> | 1 - pass | 1 - fail | | |
| Inventive 2 Avangard 100 | 1 | 2 layer structure - inner liner + PCR 2 | --> | 1 - pass | 3 - pass, 4 - fail | | |
| | 2 | 2 layer structure - inner liner + PCR 2 | --> | 1 - pass | 3 - pass | 1 - pass | 1 - pass |
| Inventive 3 EFS HDPE | 1 | 2 layer structure - inner liner + PCR 3 | --> | 1 - pass | 1 - fail | | |
| | 2 | 2 layer structure - inner liner + PCR 3 | --> | 1 - pass | 1 - pass, 2 - fail | | |
| Inventive 4 EFS Grey | 1 | 2 layer structure - inner liner + PCR 4 | --> | 1 - pass | 1 - pass, 2 - fail | | |
| | 2 | 2 layer structure - inner liner + PCR 4 | --> | 1 - pass | 1 - pass, 2 - fail | | |
| Inventive 5 EFS Translucent | 1 | 2 layer structure - inner liner + PCR 5 | --> | 1 - pass | 1 - pass, 2 - fail | | |
| | 2 | 2 layer structure - inner liner + PCR 5 | --> | 1 - pass | 3 - pass | 1 - pass | 1 - pass |

From Table 2, each flexible pouch CS1-4 had a 50% failure rate for a drop test at 1.22 meters. In Table 3, the inventive examples (IE), IE1-5, each passed 100% at drop test of 1.22 meters. IE 4-5 each pass from the drop test from 1.22 meters and also pass a subsequent drop test from 1.52 meters without failure/leakage.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A flexible pouch comprising:
a first layer structure and a second layer structure, each layer structure comprising
(i) an inner liner that is a multilayer film and
(ii) an outer sheath,
the first layer structure superimposed on the second layer structure such that the inner liners oppose each other, the first layer structure and the second layer structure define a common peripheral edge;
each inner liner (i) composed of a flexible film composed of non-PCR polymeric material;
each outer sheath is a monolayer film (ii) consisting of a post-consumer resin (PCR) that is 100 wt % polyethylene-PCR selected from the group consisting of high density polyethylene PCR, linear low density polyethylene PCR, low density polyethylene PCR, and combinations thereof, the 100 wt % polyethylene-PCR having a GI200 value from greater than 50 to 10,000;

a peripheral heat seal along at least a portion of the common peripheral edge, the peripheral heat seal sealing the first layer structure to the second layer structure such that (i) each outer sheath is directly sealed to its respective inner liner along the peripheral heat seal, and (ii) the inner liners are directly sealed to each other along the peripheral heat seal;

an interface between the inner liner and its respective outer sheath, and no adhesive contact occurs between the inner liner and its respective outer sheath except at the peripheral heat seal; and a gap is present at the interface, except at the peripheral heat seal.

2. The flexible pouch of claim 1 wherein the PCR has a GI200 value from 100 to 10,000.

3. The flexible pouch of claim 1 wherein each layer structure comprises from greater than 50 vol % to 95 vol % of the outer sheath and from less than 50 vol % to 5 vol % of the inner liner.

4. The flexible pouch of claim 3 wherein the peripheral heat seal comprises a layer configuration of first outer sheath, first liner, second liner, and second outer sheath from a cross-sectional view; and the peripheral heat seal comprises the first outer sheath heat sealed to the first liner;

the first liner heat sealed to the second liner; and the second liner heat sealed to the second sheath.

5. The flexible pouch of claim 4 wherein each inner liner is a flexible multilayer film comprising at least three layers.

6. The flexible pouch of claim 5 wherein each layer structure comprises a print film.

7. The flexible pouch of claim 6 wherein the peripheral heat seal is the sole seal between the inner liner and its respective outer sheath.

8. The flexible pouch of claim 5 wherein the inner liner is in direct contact with its respective outer sheath along an entirety of the interface.

9. A flexible pouch comprising:

a first layer structure and a second layer structure, each layer structure comprising (i) from less than 50 vol % to 5 vol % of an inner liner that is a multilayer film, (ii) from greater than 50 vol % to 95 vol % of an outer sheath, and (iii) an interface between the inner liner and the outer sheath;

the first layer structure superimposed on the second layer structure such that the inner liners oppose each other, the first layer structure and the second layer structure define a common peripheral edge;

each inner liner (i) composed of a flexible multilayer film composed of non-PCR polymeric material;

each outer sheath is a monolayer film (ii)) consisting of 100 wt % of a polyethylene post-consumer resin (polyethylene-PCR), the polyethylene-PCR selected from the group consisting of high density polyethylene PCR, linear low density polyethylene PCR, low density polyethylene PCR, and combinations thereof and having a GI200 value from greater than 50 to 10,000 and a density from 0.932 g/cc to 0.965 g/cc;

a peripheral heat seal along at least a portion of the common peripheral edge, (1) the peripheral heat seal sealing the first layer structure to the second layer structure, (2) no adhesive contact occurs between the inner liner and its respective outer sheath other than at the peripheral seal;

(3) the inner liner directly contacts the outer sheath along an entirety of the interface; and (4) the inner liners are directly sealed to each other along the peripheral heat seal.

10. The flexible pouch of claim 9 wherein a gap is present between the inner liner and its respective outer sheath along the interface except at the peripheral heat seal.

11. The flexible pouch of claim 10 wherein each inner liner is a flexible multilayer film comprising at least three layers.

12. The flexible pouch of claim 8 wherein the common peripheral edge defines a perimeter shape for the flexible pouch and the perimeter shape is selected from the group consisting of polygon and ellipse.

13. The flexible pouch of claim 9 wherein the common peripheral edge defines a perimeter shape for the flexible pouch and the perimeter shape is selected from the group consisting of polygon and ellipse.

14. The flexible pouch of claim 12 wherein the inner liner has an A/B/A layer structure having sealant layers A composed of an ethylene-based polymer; and an abuse layer B composed of an ethylene-based polymer different than sealant layers A.

15. The flexible pouch of claim 12 wherein the inner liner has an A/B/C/B/A layer structure having sealant layers A composed of an ethylene-based polymer;

tie layers B; and a barrier layer C.

16. The flexible pouch of claim 13 wherein the inner liner has an A/B/A layer structure having sealant layers A composed of an ethylene-based polymer; and an abuse layer B composed of an ethylene-based polymer different than sealant layers A.

17. The flexible pouch of claim 13 wherein the inner liner has an A/B/C/B/A layer structure having sealant layers A composed of an ethylene-based polymer;

tie layers B; and a barrier layer C.

18. A flexible pouch comprising:

a first layer structure and a second layer structure, each layer structure comprising (i) an outermost layer that is a post-consumer resin (PCR)) that is 100 wt % polyethylene-PCR selected from the group consisting of high density polyethylene PCR, linear low density polyethylene PCR, low density polyethylene PCR, and combinations thereof, the 100 wt % polyethylene-PCR having a GI200 value from greater than 50 to less than 10,000, (ii) an innermost layer that is a seal layer composed of non-PCR polymeric material, and (iii) a foam layer disposed between the outermost layer (i) and the innermost layer (ii), the first layer structure superimposed on the second layer structure such that the innermost layers oppose each other, the first layer structure and the second layer structure define a common peripheral edge, the common peripheral edge defining a perimeter shape;

a peripheral heat seal along at least a portion of the common peripheral edge;

the peripheral heat seal sealing the first layer structure to the second layer structure, and the innermost layers are directly sealed to each other along the peripheral heat seal.

19. The flexible pouch of claim 18 wherein the foam layer comprises a foamed PCR that is 100 wt % polyethylene-PCR selected from the group consisting of high density polyethylene PCR, linear low density polyethylene PCR, low density polyethylene PCR, and combinations thereof.

20. The flexible pouch of claim 1 wherein the 100 wt % polyethylene-PCR is void of ethylene vinyl alcohol.

* * * * *